United States Patent [19]
Greenwood et al.

[11] 3,764,512
[45] Oct. 9, 1973

[54] LASER SCANNING ELECTROPHORESIS INSTRUMENT AND SYSTEM

[75] Inventors: Ivan A. Greenwood, Stamford, Conn.; Jesse C. Kaufman, Yorktown Heights, N.Y.

[73] Assignee: The Singer Company, Little Falls, N.J.

[22] Filed: May 2, 1972

[21] Appl. No.: 249,592

[52] U.S. Cl. ............................. 204/299, 204/180 R
[51] Int. Cl. .............................................. B01k 5/00
[58] Field of Search ..................... 204/180 R, 299; 356/102, 103

[56] References Cited
UNITED STATES PATENTS

| | | | |
|---|---|---|---|
| 2,379,158 | 6/1945 | Kalischer | 356/102 X |
| 2,412,602 | 12/1946 | Chambers et al. | 204/180 R X |
| 2,494,441 | 1/1950 | Hillier | 356/102 X |
| 3,320,148 | 5/1967 | Skeggs | 204/180 R |
| 3,454,487 | 7/1969 | Riddick | 204/299 |
| 3,498,905 | 3/1970 | Strickler | 204/180 R X |
| 3,511,227 | 5/1970 | Johnson | 128/2.05 |
| 3,519,353 | 7/1970 | Franz et al. | 356/102 |
| 3,523,733 | 8/1970 | Kling et al. | 356/102 X |

Primary Examiner—John H. Mack
Assistant Examiner—A. C. Prescott
Attorney—S. A. Giarratana et al.

[57] ABSTRACT

An improved instrument and system is provided for determining the electrokinetic, or zeta potential of dispersed particles in an aqueous solution. The system to be described includes a helium-neon laser, electrophoresis cell, a lens system for expanding and focusing the laser beam to produce a focal spot within the cell, a galvanometer driven mirror for reflecting the laser beam from the lens system into the cell, electronic circuitry for applying a potential across the electrodes of the cell causing the dispersed particles to migrate from one electrode to the other electrode, electronic scanning circuitry for the galvanometer driven mirror and a viewing microscope. The operator controls the angular displacement and rate of angular displacement of the mirror until the focused laser spot, as viewed through the microscope, tracks the particles in the cell. A control may be calibrated directly in zeta potential. The determination of the zeta potential is useful in determining the degree of stability of particle dispersion in aqueous solutions, and the like. The function of the scanning instrument and system of the present invention is to measure the zeta potential of colloidal particles dispersed in a solution.

11 Claims, 7 Drawing Figures

Fig. 6 (Modulator)

LASER SCANNING ELECTROPHORESIS INSTRUMENT AND SYSTEM

RELATED COPENDING APPLICATION (K-1888) - Laser-Retical Electrophoresis Instrument, Robert A. Flower and Ivan A. Greenwood, Jr.

BACKGROUND OF THE INVENTION

The general expression for the zeta (electrokinetic) potential is:

$$\zeta = 4\pi (300)^2 \eta v/\epsilon E$$
$$= 36\pi \times 10^4 \eta v/\epsilon E$$

where:

| Symbol | Parameter | Units |
|---|---|---|
| $\zeta$ | Zeta potential | volts |
| $\eta$ | viscosity | poise |
| v | transfer velocity | cm/sec |
| $\epsilon$ | relative dielectric constant | — |
| E | potential gradient | volts/cm |

For an electrophoresis cell of the type employed herein, in which a potential, V (in volts) is applied across the electrodes having an effective spacing, $d$ (in cm), equation (1) can be rewritten:

$$\zeta = 36\pi \times 10^4 \eta v d/\epsilon V \quad (2)$$

or in terms of electrophoretic mobility, $\mu$ (in microns/sec per volt/cm)

$$\zeta = 36\pi\mu (\eta/\epsilon) \quad (3)$$

It is noted that the parameters, viscosity and relative dielectric constant are both temperature dependent. Laboratory temperatures generally vary between 20° C (68° F) and 25° C (77° F), so that zeta potential calibration should be performed at a known, constant temperature. Typically,

| Temp., T | Viscosity, $\eta$ | Relative Dielectric Constant, $\epsilon$ |
|---|---|---|
| 20°C | $1.0019 \times 10^{-2}$ P | 80.36 |
| 25°C | $0.892 \times 10^{-2}$ P | 78.54 |

Solving equation (3), the zeta potential (which is usually expressed in millivolts) is:

$$\zeta = 14.1\ \mu\ \text{mV} \quad \text{at } T = 20°C \quad (4)$$
$$\zeta = 12.9\ \mu\ \text{mV} \quad \text{at } T = 25°C \quad (5)$$

wherein the mobility has been expressed in the aforementioned units of microns/sec per volt/cm. Equations (4) or (5) may be found useful in converting electrophoretic mobility into zeta potential in convenient units.

The instrument calibration initially required determination of the maximum anticipation transfer velocity to which the laser focal spot rate of displacement (scanning velocity) was to be matched. Solving equation (2) for v under the conditions (T = 20°C) , $\zeta$ = 100 mV, V = 400 V, d = 10.3 cm, $\eta = 1.0019 \times 10^{-2}$ P and $\epsilon$ = 80.36, a maximum beam linear velocity, $v_{max}$, of $$v_{max} = \zeta \epsilon V/36\pi \times 10^4 \eta\ d \quad (6)$$

$$= 2.75 \times 10^{-2}\ \text{cm/sec}$$

was determined. The distance from the beam deflecting mirror to the center of the electrophoresis cell was $\rho$ = 17.3 cm, thus the corresponding maximum angular velocity, $\Omega_{max}$, of the galvanometer mirror deflector was $$\Omega_{max} = v_{max}/\rho \quad (7)$$

$$= 1.59 \times 10^{-3}\ \text{rad/sec}$$

$$= 9.11 \times 10^{-2}\ \text{deg/sec}.$$ A sweep period of t = 11.2 seconds was employed, thus the maximum angular deflection, $\theta_{max}$, was $$\theta_{max} = \Omega_{max} t \quad (8)$$

$$= 1.02°$$

The angular sensitivity, $(\Delta I/\Delta\theta)$, of each of the two coils of the galvanometer was measured over the range $0° \leq \theta \leq 18°$ and in particular over the range $\theta \leq \theta \leq 2°$. The angular sensitivity, over the latter range was $$\Delta I/\Delta\theta = 14.0\ \text{mA/deg}.$$

Thus, the maximum change in drive current, $\Delta I_{max}$, was $$\Delta I_{max} = (\Delta I/\Delta\theta)(\theta_{max}) \quad (9)$$

$$= 14.3\ \text{mA}.$$

With the "HI" and "LO" calibration potentiometers (R116 and R117) set in their median position, the zeta potential potentiometer (R118-A) control set at maximum ($\zeta$ = 100 mV) and the adjustable high voltage set at maximum (+ 400 Vdc), the precision current sink parameters were adjustable to provide a coil (G101A) drive current change of 14.3 mA during the sweep period.

Since the sensitivity of the beam position potentiometer (R118-B) control was to be three times that of the zeta potential potentiometer (for "double-gripping" averaging purposes) a similar procedure was employed for the precision current sink driving the other coil (G101B), resulting in a drive current change of 3 × 14.3 mA = 42.9 mA.

The zeta potential is an indication of the electrophoretic mobility of the particles, which, in turn, is an indication of the velocity with which the particles pass through the solution under the effect of an applied electric field. The system of the invention measures the rate at which the particles pass through the solution under the influence of an applied electric field, and by that measurement provides an indication of the zeta potential.

The apparatus and system of the invention finds particular utility, for example, in the water processing industry. For example, the instrument of the invention is useful in the industrial processing of colloidal suspensions, and particularly in the purification of industrial and drinking water.

When an electric potential is applied to the electrodes of an electrophoresis cell, the charged particles migrate under the influence of the resulting electric field toward the electrode of opposite polarity. This migration can be observed under a microscope, and such a measuring technique is standard in the prior art electrophoresis apparatus. Such apparatus is described, for example, in U.S. Pat. No. 3,454,478, which issued July 8, 1969, in the name of Thomas M. Riddick. The electrophoretic mobility, that is the velocity of the particles per unit field strength, is measured in the Riddick apparatus by timing the particles viewed through the microscope across a fixed distance in an observation chamber under an electric field of known strength. By this process, the mobility of the individual particles of different shapes and sizes may be measured, and the corresponding zeta potential may be determined.

However, the prior art cell, and its associated measuring system, has limited feabilility in determining zeta potential in the case of finished quality water, in which the number of colloidally suspended particles is relatively small. The small number of minute particles cannot be adequately observed in the microscopic field of this instrument unless the operator is extremely expert in setting up and viewing the necessary dark field illumination and, in any event, the instrument is difficult to use under all conditions. Further, the prior art instrument requires a manual conversion from the time measurement into zeta potential, with a different conversion factor being required for different electric fields.

Another problem in using this instrument is that only those particles close to a reticle line can be counted, and this limitation severely restricts the availability of particles which can be used with adequate accuracy. Moreover, the measurements require a high degree of skill on the part of the operator. Other electrophoresis systems existed prior to this instrument, and these, for the most part required an extremely short depth-of-focus microscope, and the setting of the proper focal plane of the microscope in such prior art systems was a tedious operation and subject to inaccuracies.

The migration of the colloidal particles in the aqueous solution occurs because charged groups and ions absorbed on the surface produce a non-uniform distribution of ions in solution at the particle-liquid interface. This distribution is generally expressed in terms of zeta potential (millivolts) which may be calculated from the mobility of the particles, as described above.

The present invention provides an improved system and instrument, whereby the electrophoretic zeta potential of the particles in the electrophoresis cell is measured by tracking the particles by a scanning laser beam, and by the appropriate calibration of the controls which are adjusted so that the laser beam accurately scans in synchronism with the particles.

The present invention provides a semi-automatic system and apparatus for measuring zeta potential. The use of the semi-automatic instrument of the present invention is advantageous in that it serves to reduce human error, and thereby improves the speed, accuracy and reliability of the measurements, as compared with the time consuming prior art techniques, such as described in the Riddick patent, in which visual observations, through a microscope, of the particle movement had to be timed and tabulated.

As described above, the elements of the instrument and system to be described include a laser, an electrophoresis cell of square or rectangular cross-section, a beam expander and focusing lens system adjustable to produce a laser beam focal spot within the electrophoresis cell, a mirror-galvanometer type beam deflector for reflecting the laser beam into the cell, a viewing microscope, an adjustable voltage supply to produce a known electric field within the electrophoresis cell, and electronic circuitry for producing linear displacements and rates of linear displacement of the laser beam focal spot under the control of two manually operated controls. One of the controls represents displacement, and the other represents zeta potential. The electrophoresis cell used in a constructed embodiment of the invention, by way of example, had a square configuration with a 5 mm × 5 mm internal dimension and with a 10.3 centimeter effective length.

As will be described in more detail subsequently, the operation of the apparatus of the invention is as follows. The electrophoresis cell is filled with the aqueous solution having colloidally suspended particles whose zeta potential is to be measured. Electrodes composed, for example, of platinum-iridium (cathode) and molybdenum (anode), are placed in the cell in contact with the solution.

The operator then observes through the microscope the slowly moving focal region of the laser beam inside the electrophoresis cell, and he adjusts the sweep rate of the beam in the focal region so that it appears to move at the same rate as the particles. This may be achieved by adjusting the scanning rate control until good tracking is observed upon repetitive sweeps of the beam. This may be effectuated more rapidly by adjustment of the displacement control until the beam is centered on an individual particle at the start of its sweep, and then by adjustment of the rate control until the beam tracks the particle.

Yet another technique is to set the laser beam on a particular particle at the start of each of its sweeps by means of the displacement control, and then by subsequently tracking the particle with a "double gripping" procedure by which both the rate and displacement controls are actuated at the same time. The latter technique permits averaging over a number of particles when the procedure is repeated over several sweep periods. In any event, the rate of sweep generated by the rate control is multiplied by a factor proportional to the applied voltage so that the rate control may be calibrated directly in zeta potential. Under normal conditions the same zeta potential setting will be obtained independently of the voltage applied, which is of considerable convenience to the operator.

The system and apparatus of the present invention has certain advantages over the prior art systems, previously mentioned. For example, the use of laser illumination permits even an inexperienced operator to observe the particles clearly even in situations where the particles are not visible in the prior art instrument, as is the case of high quality finished water. Moreover, once the tracking dials in the system of the present invention have been manipulated to synchronize the scanning laser beam with the migration of the particles within the cell, zeta potential may be read directly off the dial without any additional manual conversions, as is the case with the prior system.

In the system of the present invention the voltage across the electrophoresis cell may be adjusted without affecting the final zeta potential calibrations on the rate control dial. This permits the voltage across the cell to be set so that a balance may be found between a conveniently large particle velocity, and the absence of extraneous convective particle movement caused by heat transfer to the liquid by the conductivity currents which flow. That is, the voltage across the cell can be set for optimum cell conditions, without affecting the actual zeta readings.

In a preferred form of the instrument of the invention, the electrophoresis cell has a rectangular cross-section, and the laser focal spot traverses the cell along its length direction in a region where the average electro-endosmotic velocity of the particles is zero. The electro-endosmotic velocity arises from the fact that the liquid in the cell is set into motion by interaction with the cell wall and the electric field, independent of its particle content. Since after reaching equilibrium there can be no net liquid flow within the cell, there results a flow in one direction near each cell wall and a counter flow down the center of the tube. A closed, curved surface parallel to the cell cross-section centerline defines the region wherein the two flows balance out to zero, that is, as mentioned, where the electro-endosmotic velocity is zero. Then, particle velocity observed in a region along the curved surface of zero electro-endosmotic velocity and in the direction of the cell length, may be attributed completely to migration of the particle by electrophoresis, and not by any other extraneous cause.

In a preferred embodiment, therefore, the laser focal spot sweeps across the electrophoresis cell, along the aforementioned curved surface (representing zero electro-endosmotic velocity) near the top of the cell midway between the front and rear cell walls. Measurements are made by observing only those particles illuminated by the laser focal spot.

In the embodiment of the invention to be described, a coded angle modulation may be added to the basic scanning motion of the mirror so that the laser beam is moved to the left of its normal position for short periods and to the right of its normal position for longer periods (or vice versa) with a partial overlap of the two deflected positions. Therefore, a particle exactly centered in the undeflected position of the beam shows superimposed dots and dashes giving a continuous unblinking illumination. A particle on one side of the beam would then blink in dots, and a particle on the other side of the beam would blink in dashes. Such a technique is advantageous in the case where isolated particles are to be measured, for it permits a more precise setting of the beam to the selected particle since the width of the non-blinking zone is typically much smaller than the width of the beam itself. Another control which was found to be helpful was that of a variable aperture around the beam which enables the operator to control the beam size and brightness.

DETAILED DESCRIPTION OF THE ILLUSTRATED EMBODIMENT

Figure 1A:
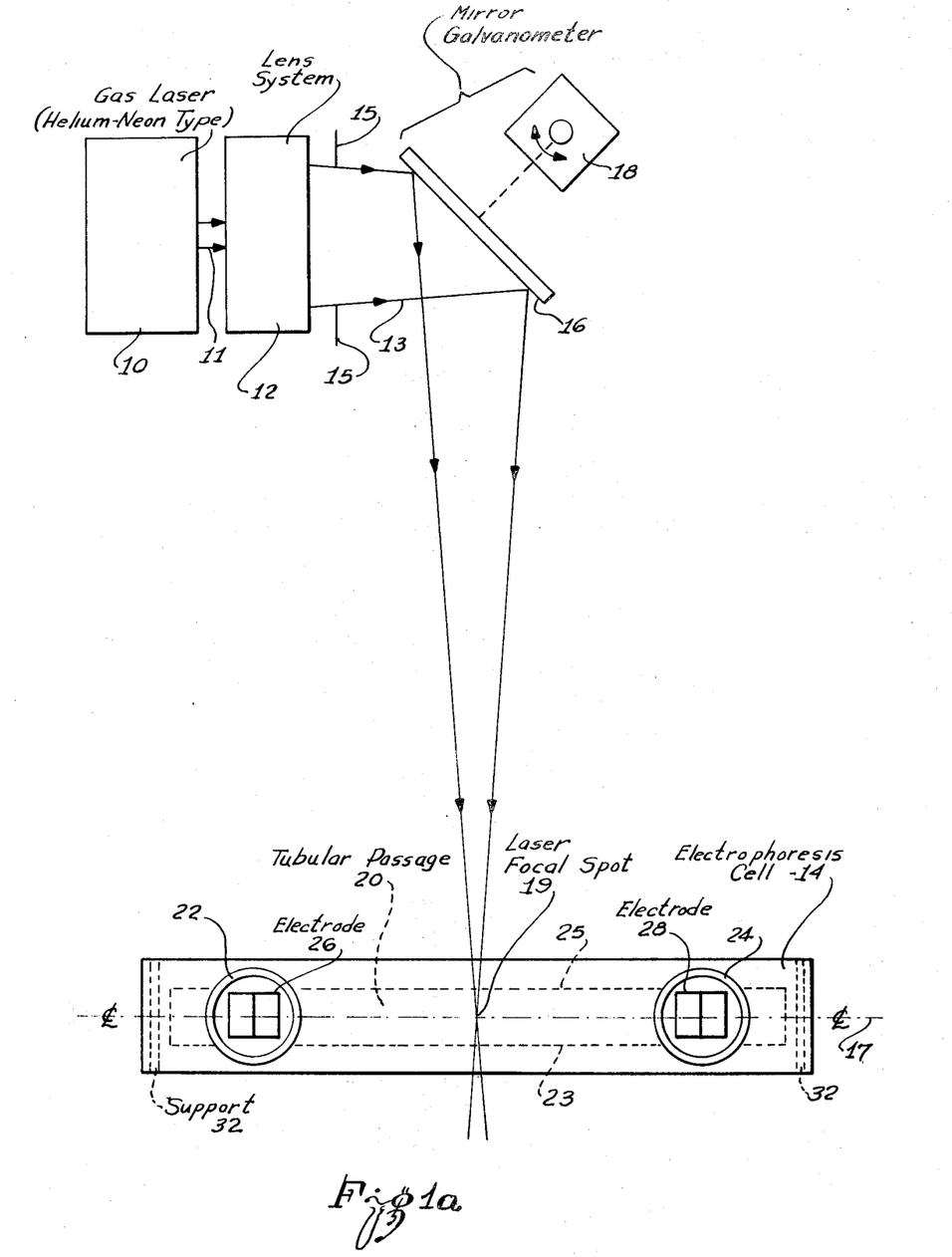
FIG. 1(a) is a plan view of an apparatus and system incorporating the concepts of the invention.

The instrument and apparatus of the present invention as shown in the schematic representation of FIG. 1(a) includes, for example, a laser 10. The laser may, for example, be a Spectra-Physics Model 131 Helium-Neon Gas Laser which produces a laser beam with a wavelength equal to 632.8 nM. Even in finished water, particles are clearly visible under laser light at the aforesaid wavelength.

A lens system 12 is provided in conjunction with the laser 10 for expanding and focusing the collimated beam 11 from the laser into a focal spot 19 at the selected region in an electrophoresis cell 14. As mentioned above, a variable aperture 15 may be provided in conjunction with the focused beam 13 to enable the operator to control the beam size and brightness. The laser beam is reflected into the cell 14 by a mirror 16 which is controlled, for example, by a galvanometer 18.

Figure 1B:
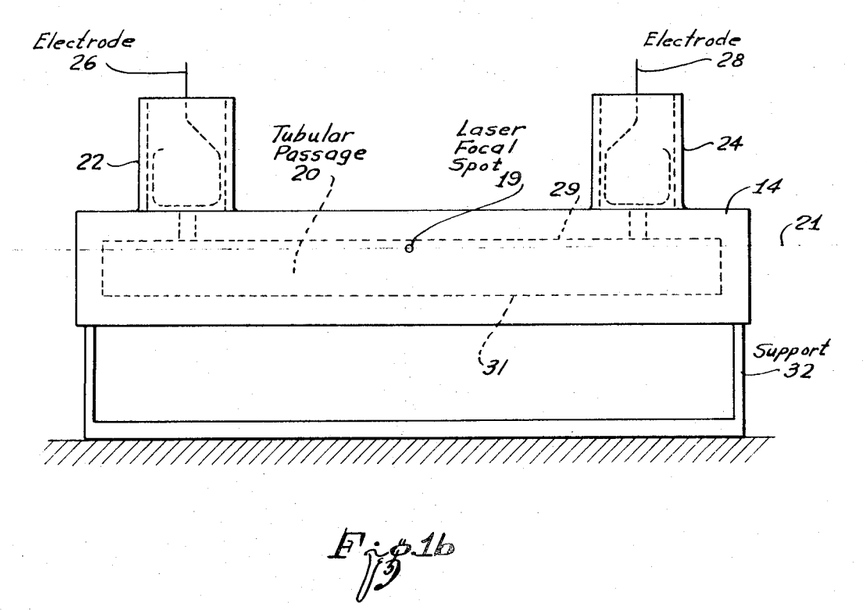
FIG. 1(b) is an elevation view of an electrophoresis cell as used in this invention.

Referring to FIG. 1(b), the cell includes a passage 20 which extends longitudinally through the base from a first sample receiving cup 22 to a second sample receiving cup 24. Electrodes 26 and 28 are positioned in the respective cups in direct contact with the test liquid in the cell. As mentioned above, the cathode electrode may be platinum-iridium and the anode electrode may be molybdenum or of other composition chosen to reduce the formation of gas bubbles within the liquid volume.

Figure 2:
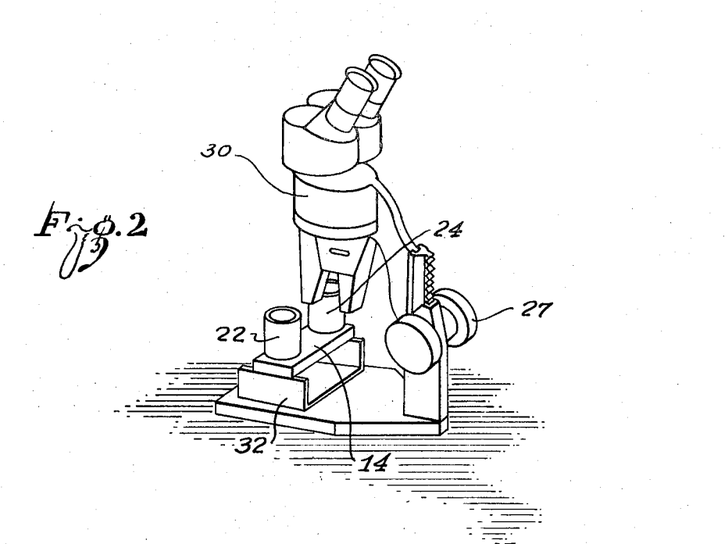
FIG. 2 is a perspective representation of an electrophoresis cell positioned to be controlled in accordance with the present invention, and an associated microscope for observing the particles within the cell.

The light beam from the laser 10 is deflected by the mirror 16 in a plane 21 (FIG. 1(b)) within the cell 14 and is focused in a focal plane 17 (FIG. 1(a)) also within the cell. The intersection of planes 17 and 21 preferably occurs in the zero electro-endosmotic region. A microscope 30 (FIG. 2) is provided, for example, which may be focused at plane 21 by means of the focusing adjustment 27. The cell is supported, for example, on a support 32 which may be composed, for example, of aluminum, or other appropriate material. The microscope 30, for example, may be a Bausch and Lomb "STEREOZOOM" Binocular microscope, although a monocular microscope is satisfactory.

Figure 3:
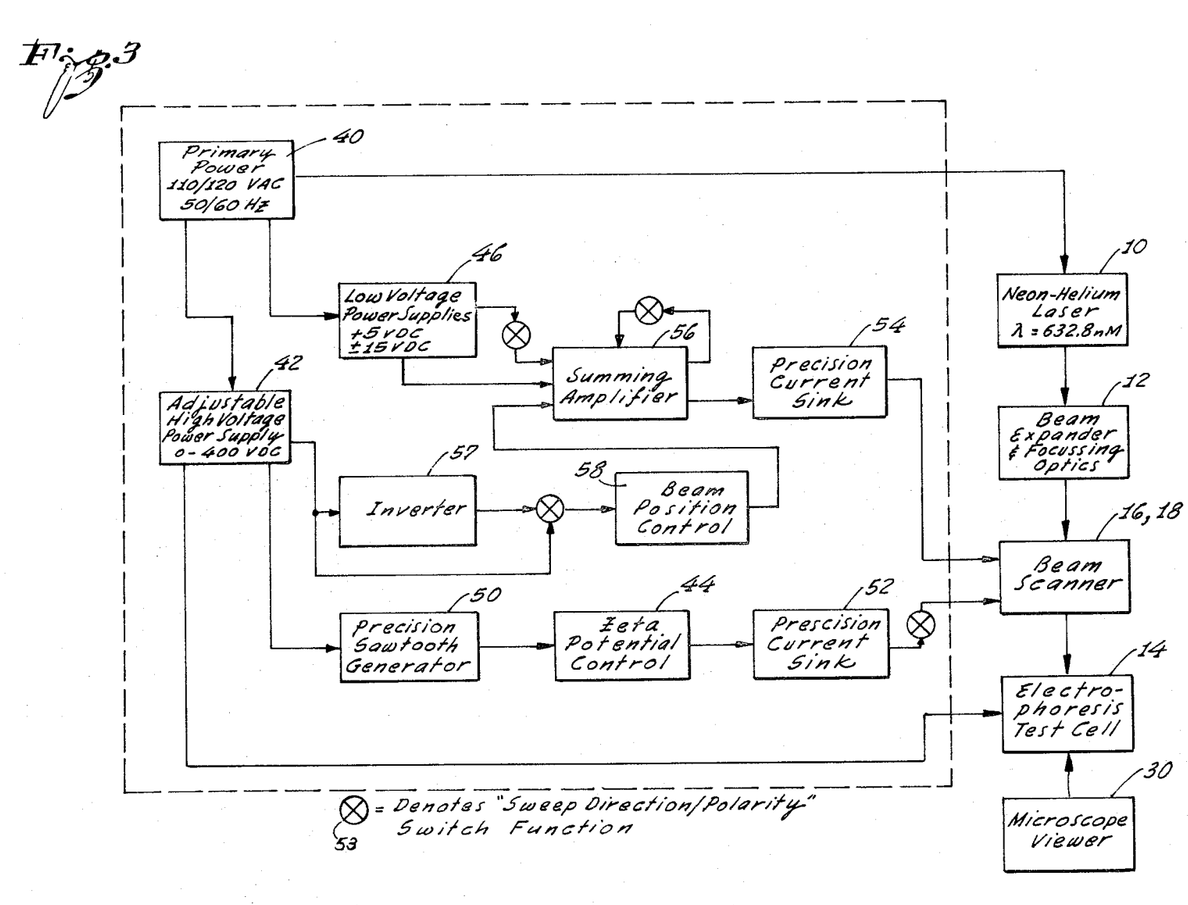
FIG. 3 is a block diagram representing the concept of the invention on a functional basis.

As shown by the block diagram of FIG. 3, the laser 10 is under the control of a primary power supply 40, and the electrodes 26 and 28 of the electrophoresis cell 14 are under the control of an adjustable high voltage power supply 42. As indicated by the block diagram of FIG. 3, the laser output at $\lambda = 632.8$ nM is 1.5 mW in the TEM$_{00}$ mode. The beam expander and focusing lens assembly 12 is secured to the laser housing. A threaded barrel provides focusing range adjustment. The mirror-galvanometer assembly 16, 18 which forms the beam scanner is oriented so that the reflected beam is approximately normal to the incident laser beam as shown in FIG. 1(a). The laser beam is deflected in the horizontal plane 21, tending a full angle of 1.0° (maximum) when the high voltage control of the adjustable high voltage power supply 42 is set, for example, to +400 V dc, and when the zeta potential control 44 is set to ± 100 mV dc, as explained above.

The electrophoresis test cell 14 is oriented in the horizontal plane with its long dimension approximately normal to the reflected laser beam. The focal region of the laser beam is nominally midway between the cell electrodes 26 and 28 of FIG. 1(A), and precisely midway between the front 23 and rear 25 inside cell walls. In a constructed embodiment, and as mentioned above, a square cell is used having internal cross section dimensions of 5.0 mm × 5.0 mm, where the effective spacing between the electrodes 26 and 28 is approximately 10.3 centimeters. The height of the cell is adjusted so that the laser beam traverses the square cross-section of the cell tangentially to its upper zero electro-endosmatic region located at plane 21 (FIG. 1(b), which is approximately 0.3 mm below the internal top wall 29, of the cell.

The microscope viewer 30 is placed directly above the laser focal spot 19 within the cell 14 and is manually focused to include plane 21 in the cell. The microscope 30 is located so that the scanned laser beam is within the field-of-view of the microscope when the cell voltage and zeta potential controls are set to a maximum.

Figure 4:
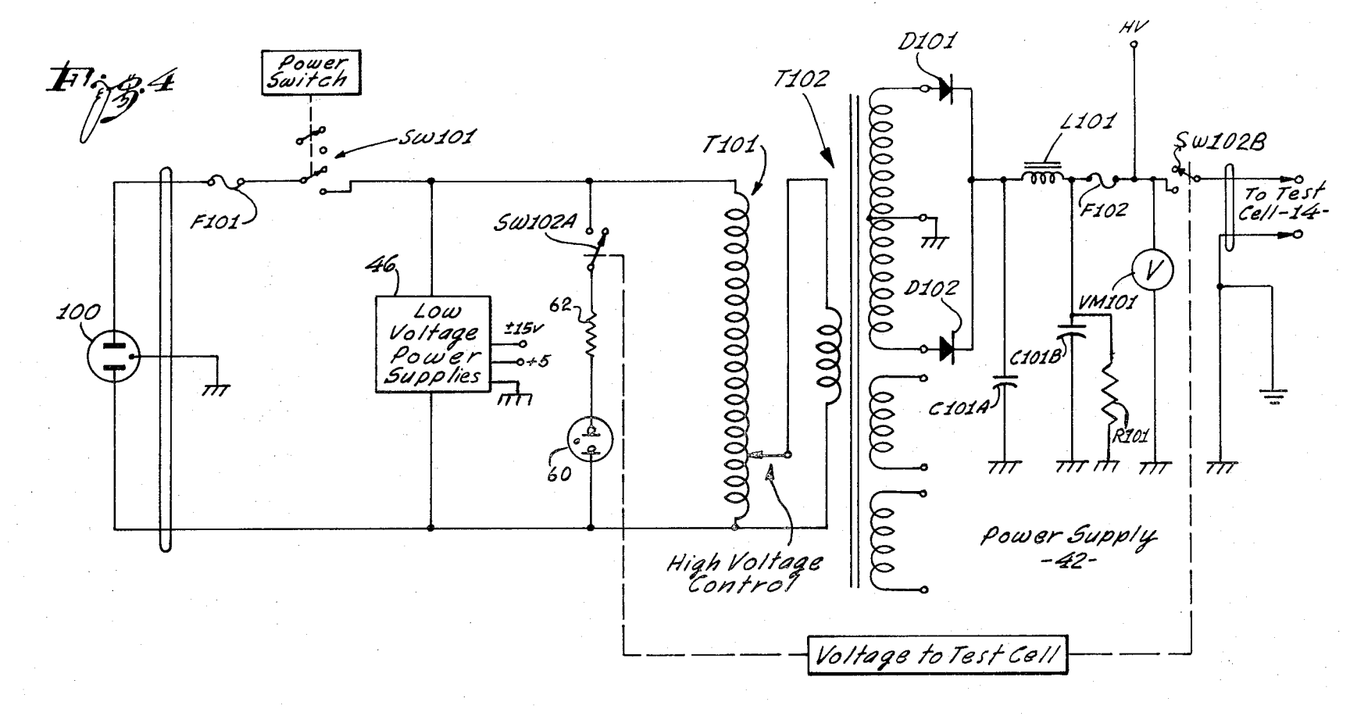
FIGS. 4 and 5 show in circuit detail appropriate electronic control systems for the invention.
Figure 5:
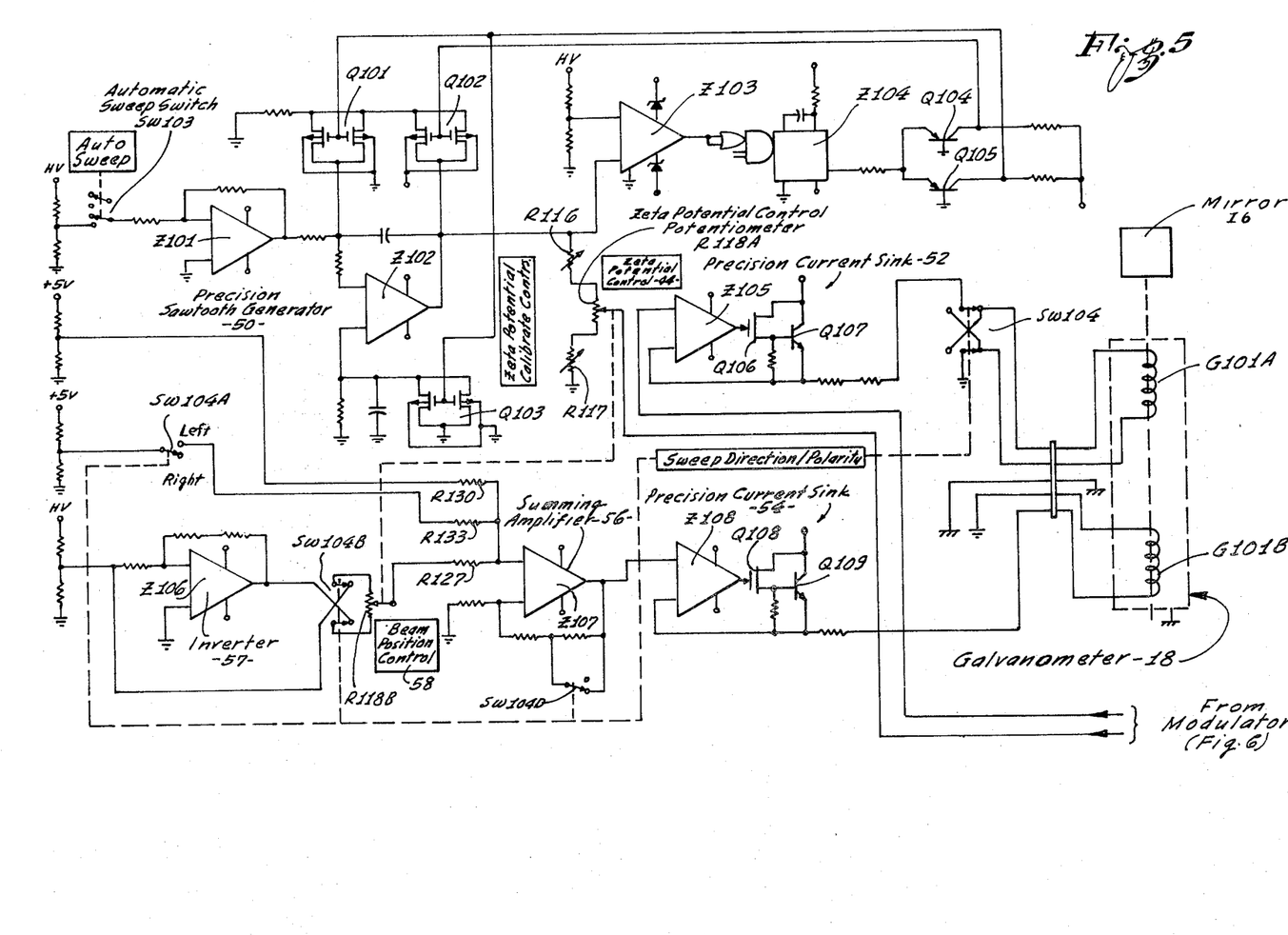
Figure 6:
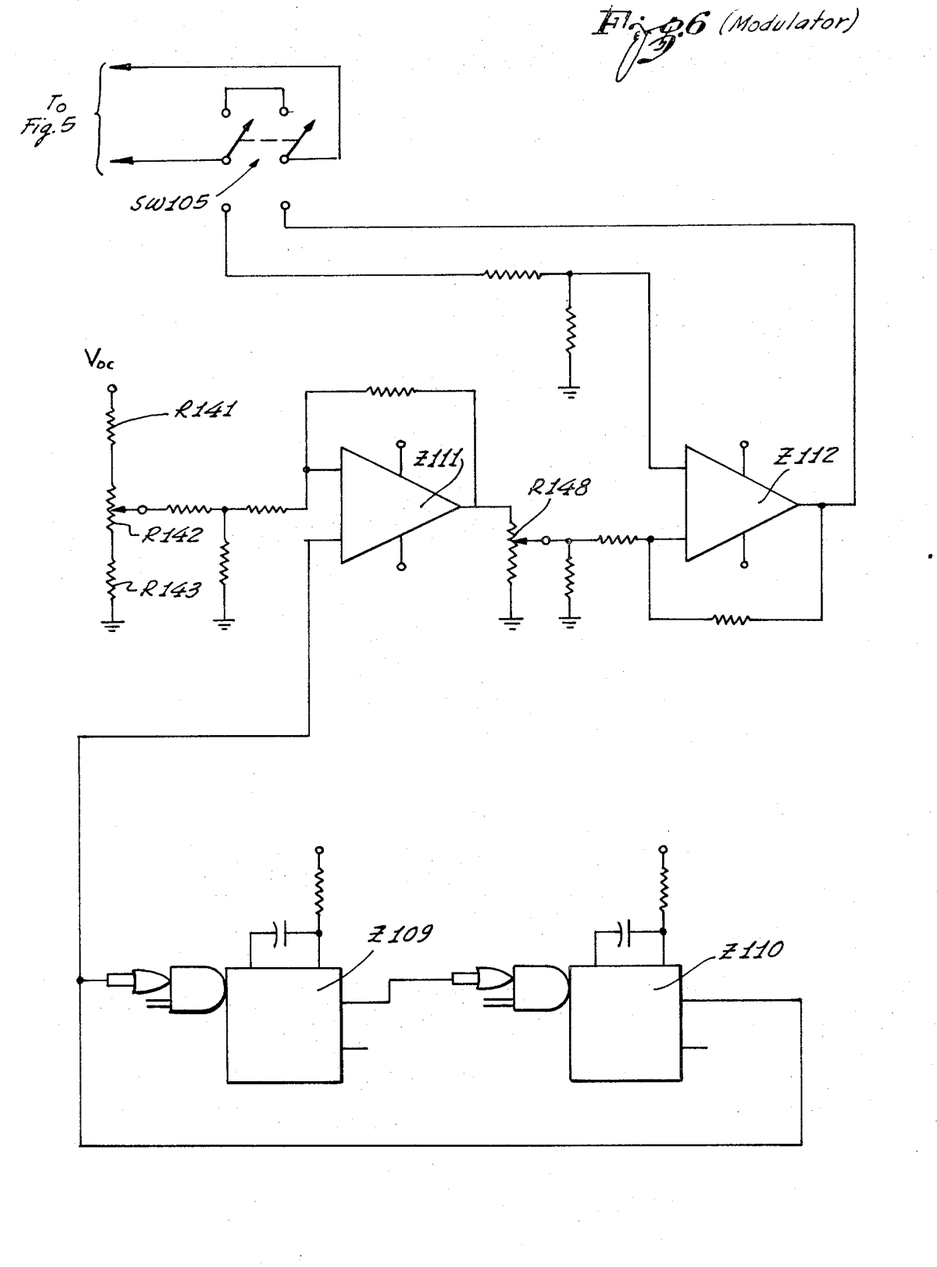
FIG. 6 is a circuit diagram of an appropriate modulation for the galvanometer mirror, for the purposes described above.

The electronic circuitry for the instrument is shown functionally in FIG. 3 within the broken line enclosure. The circuit details of the electronic system are shown in FIGS. 4, 5 and 6.

The line voltage (110/120 volts AC, 50/60 Hz), from primary power supply 40 is converted to fixed direct current voltages of +5V dc and ±15V dc by power supply module 46 and to an adjustable high voltage of 0–400V dc by the module 42. The low voltage power supplies 46 provide circuit power and fixed reference voltages, whereas the high voltage power supply 42 provides adjustable control voltages as well as the potential for the electrophoresis test cell 14.

The power supply 42 supplies a control voltage for a precision sawtooth generator 50. A sawtooth waveform is generated by the sawtooth generator 50 having a sweep period, for example, of 11.2 seconds and a flyback period of several milliseconds. The amplitude of the sawtooth waveform is proportional to the output voltage of the adjustable power supply 42. Therefore, the slope of the sawtooth ramp is always proportional to the voltage gradient across the electrophoresis cell 14, since both the sawtooth generator 50 and the cell 14 are supplied from the same power supply 42.

The sawtooth waveform from the generator 50 is applied to the precision zeta potential control represented by the block 44. A fraction of the sawtooth waveform voltage is then applied to a precision current sink, represented by the block 52, which drives one of the two galvanometer coils in the beam scanner 16, 18.

The other galvanometer coil is driven by a precision current sink 54 whose input voltage is derived from a summing amplifier 56. An input signal to the summing amplifier is derived from the fixed voltage power supply 46, independent of sweep direction. A second input signal to the summing amplifier 56, is also provided by the power supply 46 through a segment of switch function 53 which applies this second input for one beam sweep direction only. A third input signal is applied to the summing amplifier from the adjustable power supply 42 through an inverter 57, through a sweep direction segment of switch function 53, and through a beam position control 58. This third input signal may be positive, zero or negative, and its amplitude will depend both on the setting of the beam position control 58 and the setting of the adjustable high voltage power supply 42.

In the operation of the system, the electrophoresis cell is cleaned and filled with the sample solution and secured to the holder 32 under the microscope 30. The zeta potential control 44 is set to any convenient setting, possibly mid-range and the beam position control 58 is set to approximately mid-range. The high voltage adjustment control of the power supply 42 is adjusted to some suitable level. The laser 10 is then turned on and the microscope focus 27 is adjusted for the clearest image of the laser illuminated particles in the region of the scanning laser focal spot 19. The relative rates of beam scanning and particle migration may be observed. The zeta potential control 44 is then adjusted until the beam scanning and the particle migration rates are the same. If this cannot be accomplished, the sweep direction/polarity switch function 53 must be actuated to reverse the sweep direction. This causes the polarity of the zeta potential voltage readout to be of reversed sign. As mentioned above, the zeta potential control 44 can be adjusted alone, or in conjunction with the beam position control 58, or the "double gripping" procedure may be followed. When suitable tracking has been effected, the zeta potential, in millivolts, of the solution under test is read out directly on the dial of the zeta potential control 44. The polarity of the zeta potential is indicated by the position of the sweep direction/polarity switch function 53.

Referring to FIG. 4, the line voltage is supplied to the power supply circuits by means, for example, of a power plug 100. The plug is connected through a fuse F101 and through a power switch SW101 to the low voltage power supplies 46. As described above, the low voltage power supplies provide +5 volts and ±15 volts dc. The power switch is also connected to an auto transformer T101 which supplies an adjustable alternating voltage to the primary of a power transformer T102.

The voltage appearing across the secondary of the transformer T102 is rectified by a pair of diodes D101 and D102. The resulting pulsating DC voltage is filtered by the usual filter circuit including a choke coil L101 and a pair of capacitors C101A and C101B. The resulting direct current voltage appears across the resistor R101, and is applied through a high voltage fuse F102 to the high voltage output terminal designated HV.

The output is shunted by a voltmeter VM101, so that the adjustable voltage level of the high voltage power supply may be displayed. The output voltage is also applied to the test cell 14 through a switch SW102B. The switch SW102B is mechanically coupled to a switch SW102A, the latter switch being connected in circuit through a neon pilot lamp 60, and resistor 62, across the transformer T101, as shown. As explained above, the low voltage power supplies 46 provide circuit power and fixed reference voltages, whereas the high voltage power supply 42 provides adjustable control voltages for the test cell and certain elements of the electronic circuit.

As shown in FIG. 5, the precision sawtooth generator 50, is formed by a precision integrating circuit made up of a pair of operational amplifiers Z101 and Z102, and a flyback circuit made up of voltage comparator Z103 and one-shot multivibrator Z104, and the circuits of transistors Q104 and Q105. The circuits are connected as shown, and are interconnected through field effect transistors Q101, Q102 and Q103. The field effect transistors may be of the type designated 2N4067, the amplifier Z101 may be of the type designated $\mu$A741C, the amplifier Z102 may be of the type designated LM308D, the comparator Z103 may be of the type designated $\mu$A710C, and the integrated circuit Z104 may be of the type designated 9601, manufactured by Texas Instrument Company and other semiconductor manufacturers.

The amplitude of the sawtooth waveform generated by the sawtooth generator is proportional to the output voltage of the adjustable power supply 42, so that the slope of the sawtooth ramp is always proportional to the voltage gradient across the electrophoresis test cell 14, as is desired for the reasons explained above.

The switch SW103 permits the sawtooth generator 50 to be disabled when desired. The full sawtooth waveform is applied to the precision zeta potential control potentiometer R118A through two calibration potentiometers R116 and R117. A fraction of the sawtooth waveform voltage is applied to the precision current sink 52 which is made up of an operational amplifier Z105, a field-effect transistor Q106, and an NPN transistor Q107, connected as shown. The operational amplifier Z105 may be of the type designated $\mu$A741C, the transistor Q106 may be of the type designated 2N3456, and the transistor Q107 may be of the type desigated 2N2222. The resulting output from the precision current sink 52 drives one of the coils G101A of the galvanometer 18 through a reversing switch SW104 included as part of switch function 53.

The other galvanometer coil G101B is driven by the precision current sink 54 which is made up of an operational amplifier Z108, a field-effect transistor Q108 and an NPN transistor Q109, which may be the same as corresponding elements in the precision current sink 52. The input to the precision current sink 54 is derived from the summing circuit 56 which is made up of an operational amplifier Z107 which may be of the type designated $\mu$A741C, and which is connected as shown. The sweep direction/polarity switch function 53 further includes sections designated SW104d and SW104a in the circuit of the operational amplifier 56, and in the connections of the low voltage power supply 46 to the input of the summing amplifier. The switch function 53 also has a further section designated SW104b in the output of the inverter 57. The various sections of switch function 53 are ganged together such that they move in unison. The switch function 53, through its various sections, enables the laser beam to be automatically swept either to the right or to the left, provided that the automatic sweep switch SW103 is closed and always within the field of view of microscope 30.

As illustrated in FIG. 5, one input for the summing amplifier 56 is derived from the +5 volt fixed voltage source 46 as applied through a 240 kilo-ohm resistor R130, this input signal being independent of the sweep direction. The second input signal to the summing amplifier Z107 is supplied through the switch SW104A and through a 240 kilo-ohm resistor R133, and is provided only when the laser beam sweeps to the left. The third input signal to the summing amplifier 56 is derived from the adjustable high voltage supply 42 through the switch SW104b and through the beam position control potentiometer R118B, and through a 240 kilo-ohm resistor R127.

The inverter 57, including Z106, which may be of the type designated $\mu$A741C, provides equal and opposite voltage to the extreme positions of the beam position potentiometer R118B. The beam position potentiometer R118B is mechanically coaxial to the zeta control potentiometer R118A. The output voltage from the potentiometer R118B is positive, zero or negative. The magnitude of the voltage depends both on the beam position potentiometer setting and the setting of the adjustable high voltage supply by the autotransfromer T101.

As mentioned above, a coded angle modulation may be added to the galvanometer scanning mirror 16 so that the laser beam may be moved to the left of its normal position for short periods and to the right of its normal position for longer periods, and this may be achieved by interposing the modulator circuit of FIG. 6 between the zeta potential control potentiometer and the input of the operational amplifier Z105. When the switch SW105 of FIG. 6 is in its upper position, the potentiometer R118A is directly connected to the amplifier Z105, and the modulator of FIG. 6 is ineffective. However, when the switch SW105 is in its lower position, the operational amplifier Z112 is interposed between the potentiometer R118a and the amplifier Z105.

The modulator of FIG. 6 is connected in the indicated manner, and includes the operational amplifier Z112, and a second operational amplifier Z111, each of which may be of the type designated $\mu$A741C. The modulator also includes a pair of one-shot multivibrator circuits designated Z109 and Z110, each of which may be of the type presently designated 9601. The circuit includes an offset voltage adjustment potentiometer R142 which is connected, together with resistor R141 and R143, across a direct voltage source, of the order, for example, of 400 volts. The potentiometer R142 is connected to the input of the operational amplifier Z111, as is the output of the integrated circuit Z110. The modulator also includes a pulse amplitude adjustment control in the form of a potentiometer R148 at the output of the amplifier Z111, and which is connected to the input of the amplifier Z112.

As mentioned above, the circuit of FIG. 6 operates to move the laser beam to the left of its normal position for short periods and to the right of its normal position for longer periods, with a partial overlap of the two deflected positions. Therefore, when the modulator is operational, a particle exactly centered in the normal position of the beam shows superimposed dots and dashes giving a continuous unblinking illumination. However, a particle on one side of the normal position of the beam blinks in dots, and a particle on the other side of the normal position of the beam blinks in dashes.

The modulator is effective in the case of isolated particles in assisting the adjustment of the system to a desired particle. However, where the particle density is high, the displacement modulation lights up other particles and distracts the operator, so that the switch SW105 should be switched to its up position to disable the modulator for such a situation.

When the modulation switch SW105 is moved to its lower or ON position, a pulsed waveform is added in the amplifier Z112 to the sawtooth waveform derived from the zeta potential potentiometer R118a. The pulsed waveform is obtained from a free running multivibrator formed by the interconnection of the circuits Z109 and Z110 as shown and having "on" and "off" periods, for example, of approximately 0.1 second and 0.7 seconds, respectively.

The potentiometer R142, and the summing circuit formed by the operational amplifier Z111 provide the desired zero voltage level setting for the waveform. The second potentiometer R148 enables the magnitude of the modulation to be optimized for a given dispersed particle size and laser focal spot size combination.

The eventual result of the two waveforms applied to the amplifier Z112 is a net motion of the mirror 16 consisting of a superposition of two motions, namely, a slow, linear sweeping motion associated with the sawtooth waveform and a relatively small scale, back and forth motion associated with the coded angle modulation. When a particle is located in the plane of the scan, but slightly off center with respect to the normal beam focal position, the particle is illuminated in a pulse fashion for periods of 0.1 seconds, if on one side, and for periods of 0.7 seconds, if on the other side, the illumination occurring every 0.8 seconds, insofar as a constructed embodiment is concerned.

The blinking of the particle indicates to the examiner whether it is leading or laggging the normal position of the scanning beam. The change in modulation factor also indicates to the operator the direction of the relative velocity between the particle migration and the beam scan. Therefore, the operator may implement the necessary corrective actions to cause the particles to remain centered with respect to the normal beam position as indicated by a continuous illumination of that particle, so that the desired tracking may be effectuated for proper read-out of the zeta potential.

The invention provides, therefore, an improved and relatively simple system which enables an operator to determine the zeta potential of dispersed particles. The system and instrument of the invention is most advantageous in that it is capable of producing accurate results, and yet does not require any high degree of skill on the part of the operator.

Although the invention has been illustrated by describing a system wherein the particle velocity is monitored in the plane of zero electro-endosmatic velocity nearest the top of the cell, it is to be remembered that the region of zero electro-endosmatic velocity is in fact a closed curved surface, in close proximity to the cell walls, which runs the length of the electrophoretic cell. Therefore there are an infinite number of planes, which intersect this surface, which could be monitored for purposes of this invention. The only determinations for working with any of these other planes would be the establishment of the geometrical relationships between the reflected laser beam and the plane intended to be monitored and between the microscope and said plane. For example, the plane parallel to plane 21 of FIG. 1(b) and positioned approximately the same distance (0.3 mm) above the lower cell wall would serve the purposes of this invention provided the laser focal spot 19, was positioned in that plane and microscope 30 was focused thereon. Alternately, if the plane which is positioned midway between the upper and lower cell wall is utilized and the laser beam and microscope are positioned accordingly to focus in this plane, and the microscope is provided with a suitably engraved reticle defining the distance in from the cell wall corresponding to the intersection of the closed curve defining the zero electro-endosmatic velocity with the plane (as is done in the instrument described in the Riddick patent) then the proper measurements may be made by observing only those particles near the reticle line. Although this requires additional operator judgment than might be desired it does relax the requirement for laser beam focusing.

Although in the preferred embodiment the laser beam is scanned at the same rate that the particles move, with the cell and microscope being fixed, it is to be appreciated that, alternatively, it is possible to keep the laser beam fixed and to physically translate the cell at a velocity equal to and oppositely directed from the particle velocity. Further it is possible to spread the laser beam (using a cylindrical lens, for example, interposed between the reflecting mirror and the cell) into a broad but thin focal region thereby illuminating a larger section of the zero velocity electroendosmatic surface and to then track particle velocity by means of a mechanically moved reticle in the microscope eye piece or to use a scanned mirror in the optical path between the microscope and the cell, with fixed reticle marks in the eye piece.

It can also be appreciated that changes in the above embodiments can be made without departing from the scope of the present invention, and that other variations of the specific construction disclosed above can be made by those skilled in the art without departing from the invention as defined in the appended claims.

What is claimed is:

1. An instrument for measuring the electrophoretic mobility of particles dispersed in a liquid and under the influence of an electric field, said instrument including:
   an electrophoresis cell for receiving and holding a liquid sample having electrophoretic responsive particles therein and in which said particles migrate under the influence of an electric field;
   means for directing an illuminating beam at said cell to illuminate the particles migrating in the sample;
   a microscope positioned to enable the particles in the cell as illuminated by the beam to be viewed by an observer; and
   means for scanning the beam to cause it to track the movement of the particles in the cell.

2. The instrument defined in claim 1, in which said directing means comprises a laser and a lens system for focusing the beam from the laser into a focal spot within the electrophoresis cell.

3. The instrument defined in claim 1, in which said scanning means comprises a mirror-galvanometer type beam deflector.

4. The instrument defined in claim 1, and which includes an adjustable power supply connected to said electrophoresis cell for producing an electric field within the cell.

5. The instrument defined in claim 3, and which includes electronic circuitry coupled to said galvanometer for producing the scanning action of the light beam, said electronic circuitry including manual controls for controlling the angular displacements of the beam and the rate of displacement.

6. The instrument defined in claim 2, in which said electrophoresis cell has a rectangular cross section, and in which said lens system focuses the light beam from the laser cell to a focal point in a region of said cell in which the average electro-endosmotic velocity is essentially zero.

7. The instrument defined in claim 5, and which includes modulating circuitry in circuit with said electronic circuitry for introducing an additional scanning action to the galvanometer so that the light beam is moved to one side of its normal position for short periods and to the other side of its normal position for periods longer than said short periods.

8. The combination defined in claim 1, in which said scanning means comprises a galvanometer, and which includes electronic circuitry connected through said galvanometer for introducing a scanning signal thereto, and an adjustable power supply connected to said electronic circuitry and to said electrophoresis cell to introduce a common adjustable voltage to said circuitry and to said cell.

9. The instrument defined in claim 8, and which includes a control in said electronic circuitry for adjusting the scanning rate of the beam in said cell.

10. The instrument defined in claim 9, in which said last-named control is calibrated in zeta potential.

11. The instrument defined in claim 9, in which said last-named control is calibrated in mobility.

* * * * *